(12) United States Patent
Chen et al.

(10) Patent No.: US 10,187,876 B2
(45) Date of Patent: Jan. 22, 2019

(54) TECHNIQUES FOR HANDLING CHANNEL STATE INFORMATION (CSI) IN ULTRA LOW LATENCY (ULL) LTE

(71) Applicant: QUALCOMM Incorporated, San Diego, CA (US)

(72) Inventors: Wanshi Chen, San Diego, CA (US); Shimman Arvind Patel, San Diego, CA (US); Peter Gaal, San Diego, CA (US); Hao Xu, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 14/977,163

(22) Filed: Dec. 21, 2015

(65) Prior Publication Data

US 2016/0205676 A1     Jul. 14, 2016

Related U.S. Application Data

(60) Provisional application No. 62/102,419, filed on Jan. 12, 2015.

(51) Int. Cl.
*H04L 1/00* (2006.01)
*H04W 72/04* (2009.01)
(Continued)

(52) U.S. Cl.
CPC ....... *H04W 72/0406* (2013.01); *H04L 1/0026* (2013.01); *H04L 1/0029* (2013.01);
(Continued)

(58) Field of Classification Search
CPC . H04L 5/0053; H04L 5/0057; H04L 25/0224; H04L 5/0051; H04L 5/005;
(Continued)

(56) References Cited

U.S. PATENT DOCUMENTS

2010/0034092 A1* 2/2010 Krishnamurthy ..... H04W 56/00
370/241
2011/0235533 A1* 9/2011 Breit .................... H04B 7/0452
370/252

(Continued)

FOREIGN PATENT DOCUMENTS

| EP | 2919506 A1 | 9/2015 |
|---|---|---|
| WO | WO-2014/071638 A1 | 5/2014 |
| WO | WO-2014/161105 A1 | 10/2014 |

OTHER PUBLICATIONS

Fujitsu et al: "Draft LS on CSI Measurements on Restricted Subframes for eICIC", 3GPP Draft, R1-106515, 3rd Generation Partnership Project (3GPP), Mobile Competence Centre, 650, Route Des Lucioles , F-06921 Sophia-Antipolis Cedex, France, vol. RAN WG1, No. Jacksonville, USA, Nov. 15, 2010, Nov. 20, 2010 (Nov. 20, 2010), XP050489939, 2 pages, [retrieved on Nov. 20, 2010] the whole document.

(Continued)

*Primary Examiner* — Ivan O Latorre
(74) *Attorney, Agent, or Firm* — Anthony R. Morris

(57) ABSTRACT

Techniques for handling Channel State Information (CSI) for ultra low latency (ULL) in Long Term Evolution (LTE) devices are presented. For example, an example method of reporting CSI to a network entity is presented. Such an example method may include detecting a CSI reporting trigger for reporting CSI to the network entity and identifying, based on detection of the CSI reporting trigger, a subframe region for which the CSI is to be generated. In an aspect, the subframe region is included in a plurality of subframe regions, where each subframe region of the plurality of subframe regions includes at least one symbol of a subframe. In an additional aspect, the example method may include generating the CSI based on the subframe region and transmitting the CSI to the network entity.

28 Claims, 11 Drawing Sheets

(51) Int. Cl.
  *H04L 25/02* (2006.01)
  *H04L 5/00* (2006.01)
  *H04B 7/06* (2006.01)
  *H04B 7/0417* (2017.01)

(52) U.S. Cl.
  CPC ............ *H04L 5/005* (2013.01); *H04L 5/0051* (2013.01); *H04L 25/0224* (2013.01); *H04B 7/0417* (2013.01); *H04B 7/0626* (2013.01); *H04B 7/0643* (2013.01)

(58) Field of Classification Search
  CPC .. H04L 1/0029; H04L 1/0026; H04W 72/042; H04W 72/082; H04W 16/32; H04W 72/0406; H04B 17/309; H04B 7/0619–7/0663; H04B 7/0643; H04B 7/0417; H04B 7/0626
  See application file for complete search history.

(56) References Cited

U.S. PATENT DOCUMENTS

| | | | | |
|---|---|---|---|---|
| 2012/0106374 A1* | 5/2012 | Gaal | ............... | H04L 5/0048 370/252 |
| 2012/0201152 A1* | 8/2012 | Yoo | ............... | H04B 17/345 370/252 |
| 2013/0033998 A1* | 2/2013 | Seo | ............... | H04W 24/00 370/252 |
| 2013/0208604 A1* | 8/2013 | Lee | ............... | H04L 25/0226 370/252 |
| 2013/0242904 A1* | 9/2013 | Sartori | ............... | H04L 5/0053 370/329 |
| 2013/0258965 A1* | 10/2013 | Geirhofer | ............... | H04W 72/048 370/329 |
| 2013/0337863 A1* | 12/2013 | Lee | ............... | H04W 88/06 455/524 |
| 2014/0029584 A1* | 1/2014 | Qu | ............... | H04W 72/042 370/336 |
| 2014/0044033 A1* | 2/2014 | Molteni | ............... | H04W 52/241 370/311 |
| 2014/0093004 A1* | 4/2014 | Gomadam | ............... | H04B 7/0456 375/267 |
| 2014/0226582 A1* | 8/2014 | Zeng | ............... | H04B 7/0626 370/329 |
| 2015/0124663 A1* | 5/2015 | Chen | ............... | H04L 5/0053 370/278 |
| 2015/0131560 A1* | 5/2015 | Von Elbwart | ............... | H04W 72/048 370/329 |
| 2015/0244444 A1* | 8/2015 | Mazzarese | ............... | H04B 7/04 370/252 |
| 2015/0289208 A1* | 10/2015 | Liu | ............... | H04W 52/0229 370/252 |
| 2015/0382222 A1* | 12/2015 | Park | ............... | H04L 1/00 370/252 |
| 2016/0013905 A1* | 1/2016 | Seo | ............... | H04L 5/0048 370/329 |
| 2016/0127952 A1* | 5/2016 | You | ............... | H04J 11/00 370/252 |
| 2016/0353317 A1 | 12/2016 | Kim et al. | | |
| 2016/0355317 A1* | 12/2016 | Nishijima | ............... | F24C 7/10 |

OTHER PUBLICATIONS

International Search Report and Written Opinion—PCT/US2015/067643—ISA/EPO—dated Jun. 23, 2016. 21 Total Pages.
Partial International Search Report—PCT/US2015/067643—ISA/EPO—dated Apr. 7, 2016. 9 Total Pages.

\* cited by examiner

TECHNIQUES FOR HANDLING CHANNEL STATE INFORMATION (CSI) IN ULTRA LOW LATENCY (ULL) LTE

CROSS-REFERENCE TO RELATED APPLICATION

The present application for patent claims priority to Provisional Application No. 62/102,419 entitled "CHANNEL STATE INFORMATION (CSI) HANDLING IN ULTRA LOW LATENCY (ULL) LTE," filed Jan. 12, 2015, and assigned to the assignee hereof and hereby expressly incorporated by reference herein.

BACKGROUND

The present disclosure relates generally to communication systems, and more particularly, to techniques for handling channel state information (CSI) in ultra low latency (ULL) Long Term Evolution (LTE).

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In wireless communication systems employing legacy LTE, a plurality of UEs served by a particular eNodeB may be scheduled resources for communicating with the eNodeB over one or more channels using transmission time intervals (TTI) on the order of a 1 millisecond subframe. As UE capabilities and demand for bandwidth increases, lower latency in communications may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure describes example techniques for handling CSI for ULL in LTE devices. For example, an example method of reporting CSI to a network entity is presented. Such an example method may include detecting a CSI reporting trigger for reporting CSI to the network entity and identifying, based on detection of the CSI reporting trigger, a subframe region for which the CSI is to be generated. In an aspect, the subframe region is included in a plurality of subframe regions, where each subframe region of the plurality of subframe regions includes at least one symbol of a subframe. In an additional aspect, the example method may include generating the CSI based on the subframe region and transmitting the CSI to the network entity.

Additionally, the present disclosure describes an apparatus, which may include means for detecting a CSI reporting trigger for reporting CSI to the network entity. In addition, the apparatus may include means for identifying, based on detection of the CSI reporting trigger, a subframe region for which the CSI is to be generated. In an aspect, the subframe region is included in a plurality of subframe regions, and each subframe region of the plurality of subframe regions includes at least one symbol of a subframe. In an additional aspect, the apparatus may include means for generating the CSI based on the subframe region and means for transmitting the CSI to the network entity.

In addition, the present disclosure describes a non-transitory computer-readable medium storing computer-executable code for reporting CSI to a network entity, where the code includes instructions executable to detect a CSI reporting trigger for reporting CSI to the network entity. In addition, the code may include instructions executable to identify, based on detection of the CSI reporting trigger, a subframe region for which the CSI is to be generated. In some examples, the subframe region is included in a plurality of subframe regions, and each subframe region of the plurality of subframe regions includes at least one symbol of a subframe. Moreover, the code may include instructions executable to generate the CSI based on the subframe region and instructions executable to transmit the CSI to the network entity.

Furthermore, the disclosure presents an example apparatus for reporting CSI to a network entity, the apparatus including a processor, memory in electronic communication with the processor, and instructions stored in the memory. In an aspect, the instructions may be executable by the processor to detect a CSI reporting trigger for reporting CSI to the network entity and to identify, based on detection of the CSI reporting trigger, a subframe region for which the CSI is to be generated. In some example, the subframe region is included in a plurality of subframe regions, and each subframe region of the plurality of subframe regions includes at least one symbol of a subframe. Moreover, the instructions may be executable by the processor to generate the CSI based on the subframe region and to transmit the CSI to the network entity.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

DETAILED DESCRIPTION

Figure 1:
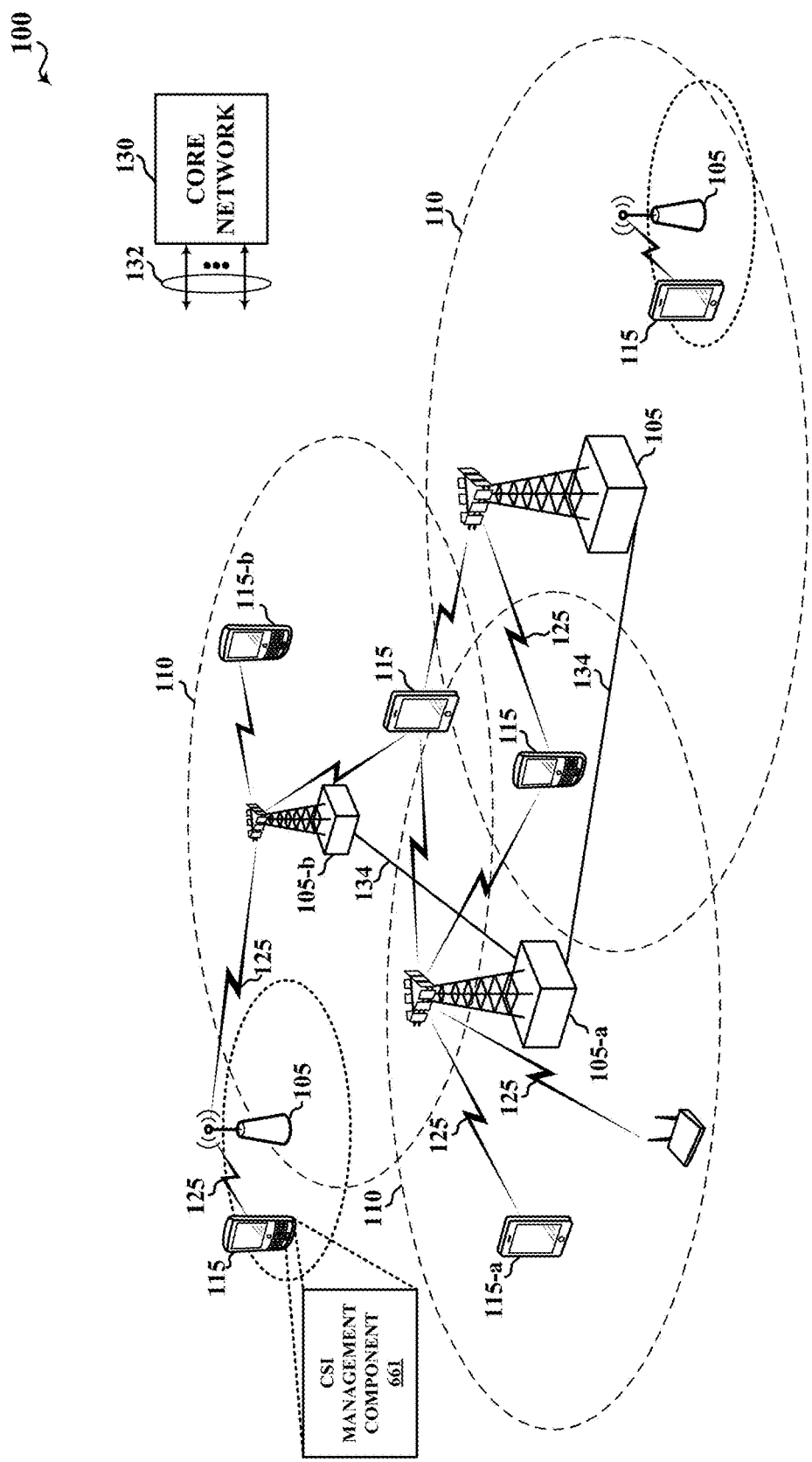
FIG. 1 shows a block diagram conceptually illustrating an example of a telecommunications system, in accordance with an aspect of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can be RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The present disclosure presents example methods and apparatuses for reporting channel state information (CSI) to a network entity (e.g., an eNodeB) of a wireless communication system based on a subframe region for which the CSI is to be generated. In an aspect, the subframe region may be one of a plurality of subframe regions into which a particular subframe is divided, where each of the subframe regions include one or more symbols of the subframe.

For instance, the subframe region may be a control region that includes at least one symbol during which information may be transmitted via one or more control channels. In such an instance, the transmissions may occur primarily or exclusively via the one or more control channels. In an alternative example, the subframe region may be a data region that includes at least one symbol during which information may be transmitted via one or more data channels. In such an example, the transmissions may occur primarily or exclusively via the one or more data channels. In further alternative examples, the subframe region may be a "grey region" that includes at least one symbol during which information may be transmitted via one or more data channels and via one or more control channels. In an aspect, a UE of the present disclosure may be configured to determine one of the above subframe regions for reporting CSI to a network entity and may generate the CSI based on the determined subframe region.

In addition, a CSI reporting process may be initiated based on receiving a CSI reporting trigger. In some instances, this CSI reporting trigger may be received from one of several communication technologies each having a unique associated transmission time interval (TTI) for communication of data and control information. For instance, in some examples, the CSI reporting trigger may be received from a network entity according to a communication technology that uses a TTI on the order of one millisecond. For purposes of the present disclosure, such a communication technology may be referred to as a "legacy" communication technology (e.g., legacy LTE, legacy system). Alternatively, in some instances, the CSI reporting trigger may be received from a network entity according to a communication technology that uses a TTI on the order of one symbol of a legacy LTE subframe, or on the order of 70-90 microseconds. For purposes of the present disclosure, such a communication technology may be referred to as an Ultra Low Latency (ULL) communication technology (e.g., ULL LTE, ULL system, ULL). In an aspect, the CSI reporting process performed by a UE may vary depending on whether the corresponding CSI trigger is received for a communication or channel utilizing a legacy communication technology and one utilizing a ULL communication technology.

In addition, any of the resource elements associated with a particular subframe (or slot) may be considered part of a control channel region or part of a data channel region of the subframe (or slot). A control channel region may include one or more resource elements carrying resource grants associated with one or more UEs served by a network entity (e.g., an eNodeB). Such resource grants may include one or more downlink resource grants and/or one or more uplink resource grants. For example, in one aspect of the present disclosure, a control channel region located in the first symbol (or first few symbols) of a subframe may be utilized for scheduling downlink frequency grants in data channel region that includes the remainder of the first slot of the subframe or for the remainder of the entire subframe. For purposes of the present disclosure, the control channel corresponding to such a control channel region may be referred to as a Quick Physical Downlink Control Channel (QPDCCH), ULL PDCCH (uPDCCH), etc.

In an aspect, the subframe-region-specific CSI reporting aspects discussed above may be performed when a CSI trigger is received for a ULL communication. In such instances, the CSI reporting process performed by the UE may have relaxed and/or simplified CSI reporting process requirements relative to those of a legacy communication. For example, under the ULL CSI reporting scheme of the present disclosure, the process may have a limited number of CSI reporting ranks for reporting CSI to the network. In addition, the ULL process may have a limited number of subbands for which CSI is reported to the network relative to legacy processes. For instance, in an aspect of the present disclosure, ULL CSI may be reported to the network using a block of 25 radio bearers (RBs) or radio bearer groups (RBGs), which may constitute a larger subband size than that of legacy CSI reporting processes.

In an additional aspect of the present disclosure, a UE may utilize differential CSI reporting relative to a previous (e.g., an immediately prior) CSI report. For instance, where an immediately prior CSI report was generated and transmitted by a UE according to a legacy CSI reporting process, a current ULL CSI reporting process may generate CSI as a differential relative to the immediately prior CSI report rather than communicating the ULL CSI wholesale, thus potentially reducing the amount of information necessary for the ULL CSI transmission.

Referring first to FIG. 1, a diagram illustrates an example of a wireless communications system 100, in accordance with an aspect of the present disclosure. The wireless communications system 100 includes a plurality of access points (e.g., base stations, eNBs, or WLAN access points) 105, a number of user equipment (UEs) 115, and a core network 130. In an aspect, the one or more of UEs 115 may include a CSI management component 661 configured to generate and transmit CSI to a network entity (e.g., access points 105) according to legacy and/or ULL CSI reporting processes described in the present disclosure.

Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each of communications links 125 may be a multi-carrier signal modulated according to the various radio technologies described above. Each modulated signal may be sent on a different carrier and may carry control information (e.g., reference signals, control channels, etc.), overhead information, data, etc.

In some examples, at least a portion of the wireless communications system 100 may be configured to operate on multiple hierarchical layers in which one or more of the UEs 115 and one or more of the access points 105 may be configured to support transmissions on a hierarchical layer that has a reduced latency with respect to another hierarchical layer. In some examples a hybrid UE 115-*a* may communicate with access point 105-*a* on both a first hierarchical layer that supports first layer transmissions with a first subframe type and a second hierarchical layer that supports second layer transmissions with a second subframe type. For example, access point 105-*a* may transmit subframes of the second subframe type that are time division duplexed with subframes of the first subframe type.

In some examples, hybrid UE 115-*a* may acknowledge receipt of a transmission by providing ACK/NACK for the transmission through, for example, a HARQ scheme. Acknowledgments from hybrid UE 115-*a* for transmissions in the first hierarchical layer may be provided, in some examples, after a predefined number of subframes following the subframe in which the transmission was received. The hybrid UE 115-*a*, when operating in the second hierarchical layer may, in examples, acknowledge receipt in a same subframe as the subframe in which the transmission was received. The time required to transmit an ACK/NACK and receive a retransmission may be referred to as round trip time (RTT), and thus subframes of the second subframe type may have a second RTT that is shorter than a RTT for subframes of the first subframe type.

In other examples, a second layer UE 115-*b* may communicate with access point 105-*b* on the second hierarchical layer only. Thus, hybrid UE 115-*a* and second layer UE 115-*b* may belong to a second class of UEs 115 that may communicate on the second hierarchical layer, while legacy UEs 115 may belong to a first class of UEs 115 that may communicate on the first hierarchical layer only. Access point 105-*b* and UE 115-*b* may communicate on the second hierarchical layer through transmissions of subframes of the second subframe type. Access point 105-*b* may transmit subframes of the second subframe type exclusively, or may transmit one or more subframes of the first subframe type on the first hierarchical layer that are time division multiplexed with subframes of the second subframe type. Second layer UE 115-*b*, in the event that access point 105-*b* transmits subframes of the first subframe type, may ignore such subframes of the first subframe type. Thus, second layer UE 115-*b* may acknowledge receipt of transmissions in a same subframe as the subframe in which the transmissions are received. Thus, second layer UE 115-*b* may operate with reduced latency compared to UEs 115 that operate on the first hierarchical layer.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies. The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE/LTE-A network communication systems, the terms evolved Node B (eNodeB or eNB) may be generally used to describe the access points 105. The wireless communications system 100 may be a Heterogeneous LTE/LTE-A/ULL LTE network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs 115 with service subscriptions with the network provider. A small cell would generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via backhaul links 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communications links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communications links 125 may carry transmissions of each hierarchical layer which, in some examples, may be multiplexed in the communications links 125. The UEs 115 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples access points 105 and UEs 115 may utilize carrier aggregation to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. Hybrid UE 115-*a*, and/or second layer UE 115-*b* may, in certain examples, receive and/or transmit one or more subframes in a second hierarchical layer utilizing a single carrier that has a bandwidth greater than a bandwidth of one or more of the separate carriers. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communications system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communications links 125 for LTE downlink transmissions for each hierarchical layer, while single carrier frequency division multiple access (SC-FDMA) communications signals may be used in the communications links 125 for LTE uplink transmissions in each hierarchical layer. Additional details regarding implementation of hierarchical layers in a system such as the wireless communications system 100, as well as other features and functions related to communications in such systems, are provided below with reference to the following figures.

Figure 2:
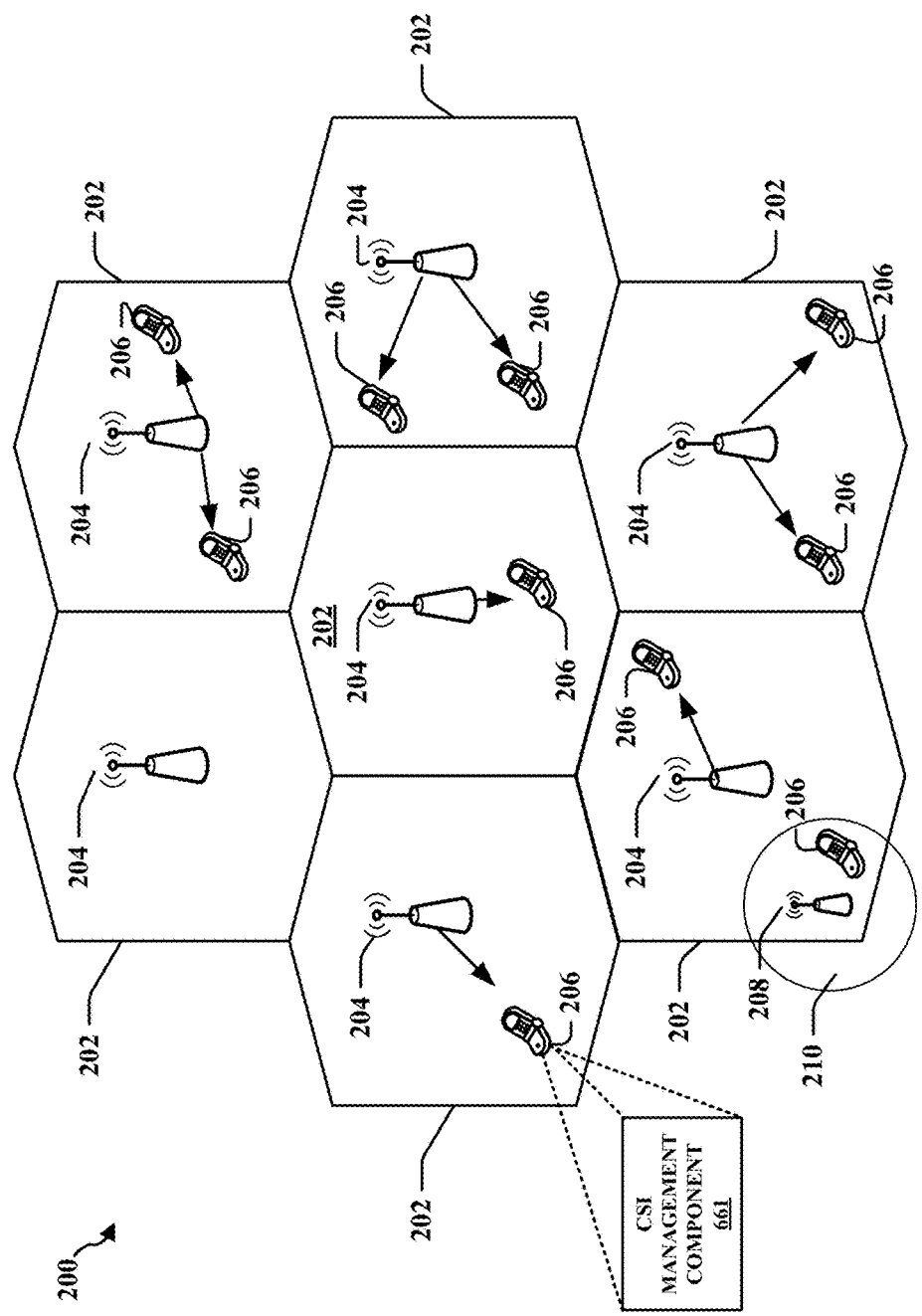
FIG. 2 is a diagram illustrating an example of an access network.

FIG. 2 is a diagram illustrating an example of an access network 200 in an LTE (and/or ULL LTE) network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC for all the UEs 206 in the cells 202. Similarly, one or more of UEs 206 may include a CSI management component 661 configured to configured to generate and transmit CSI to a network entity (e.g., access points 105 of FIG. 1 or macro eNBs 204 or lower power class eNBs 208 of FIG. 2) according to legacy and/or ULL CSI reporting processes described in the present disclosure. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
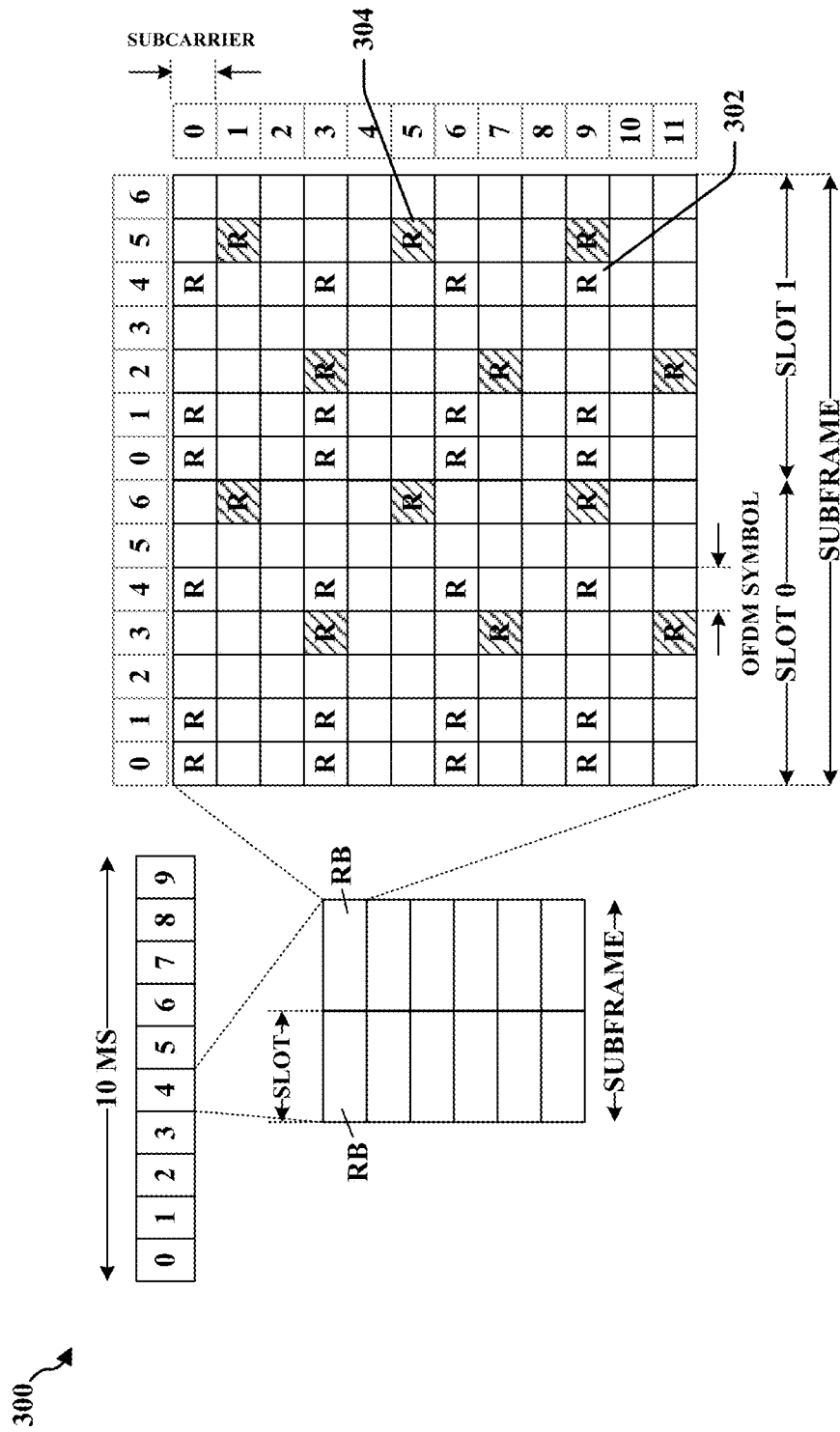
FIG. 3 is a diagram illustrating an example of a DL frame structure in LTE.

FIG. 3 is a diagram 300 illustrating an example of a DL frame structure in legacy LTE, which, in some examples, may be utilized in conjunction with the downlink frame structure provided by the present disclosure. A frame (10 ms) may be divided into 10 equally sized sub-frames (1 ms each). Each sub-frame may include two consecutive slots. A resource grid may be used to represent two slots, each time slot including a resource element block. The resource grid is divided into multiple resource elements, each of which corresponds to a particular frequency and time allocation, and in particular, a subcarrier of a specified OFDM symbol. In LTE, a resource element block may contain 12 consecutive subcarriers in the frequency domain and, for a normal cyclic prefix in each OFDM symbol, 7 consecutive OFDM symbols in the time domain, or 84 resource elements. For an extended cyclic prefix, a resource element block may contain 6 consecutive OFDM symbols in the time domain and has 72 resource elements. In an additional aspect, although not explicitly shown in FIG. 3, the resource elements of the resource grid may be grouped into groups of resource elements, each of which may be referred to as a resource element group (REG). In some examples, an REG may include a group of four resource elements of an OFDM symbol that are associated with four consecutive subcarriers. In other examples, an REG may include five consecutive subcarriers where the REG includes a reference signal resource element in addition to the four other subcarriers in the symbol.

Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource element blocks upon which the corresponding PDSCH is mapped. The number of bits carried by each resource element depends on the modulation scheme. Thus, the more resource element blocks that a UE receives and the higher the modulation scheme, the higher the data rate for the UE.

Figure 4:
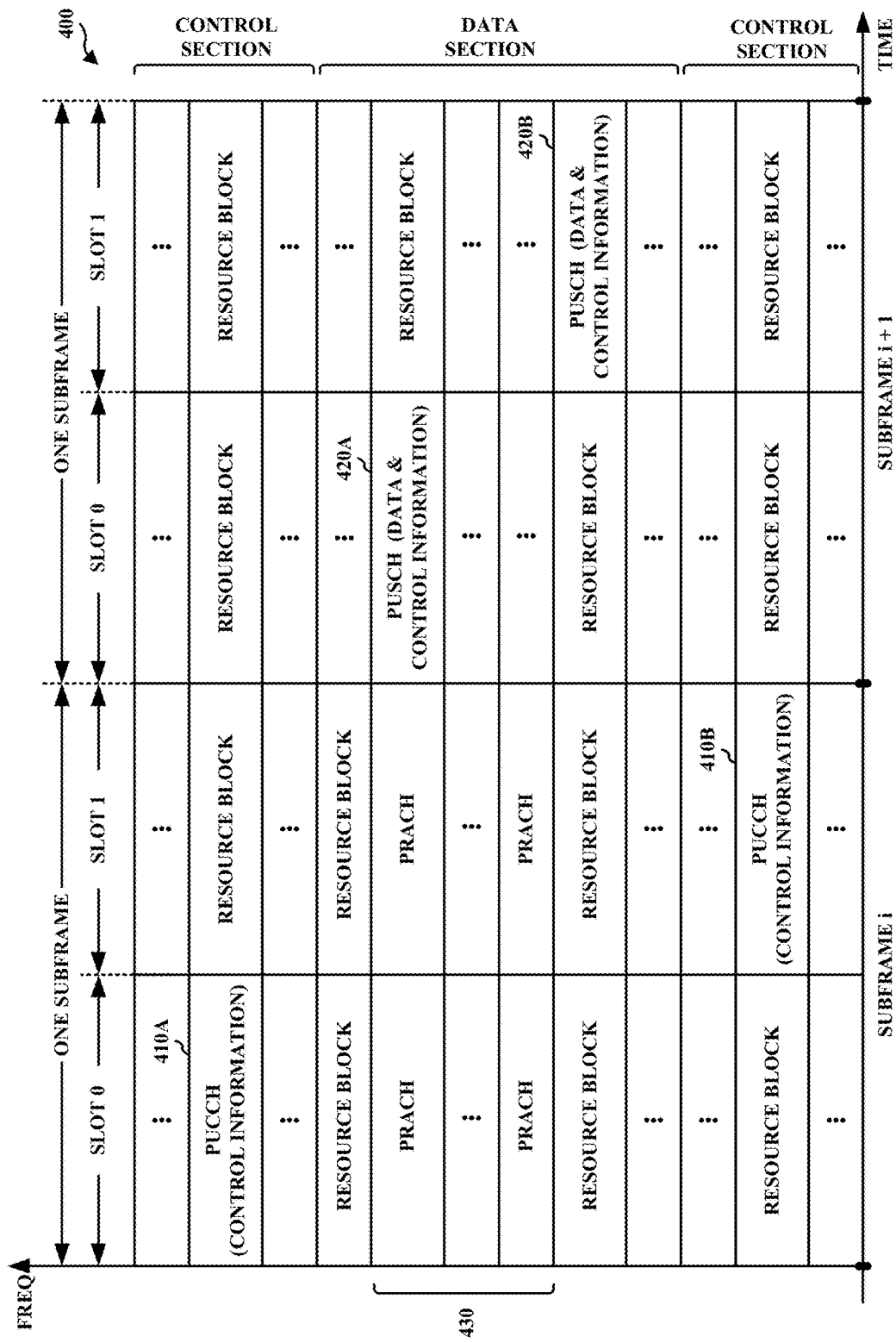
FIG. 4 is a diagram illustrating an example of an UL frame structure in LTE.

FIG. 4 is a diagram 400 illustrating an example of an UL frame structure in legacy LTE. The available resource element blocks for the UL may be partitioned into a data section and a control section. The control section may be formed at the two edges of the system bandwidth and may have a configurable size. The resource element blocks in the control section may be assigned to UEs for transmission of control information. The data section may include all resource element blocks not included in the control section. The UL frame structure results in the data section including contiguous subcarriers, which may allow a single UE to be assigned all of the contiguous subcarriers in the data section.

A UE may be assigned resource element blocks 410a, 410b in the control section to transmit control information to an eNB. The UE may also be assigned resource element blocks 420a, 420b in the data section to transmit data to the eNB. The UE may transmit control information in a physical UL control channel (PUCCH) on the assigned resource element blocks in the control section. The UE may transmit only data or both data and control information in a physical UL shared channel (PUSCH) on the assigned resource element blocks in the data section. A UL transmission may span both slots of a subframe and may hop across frequency.

A set of resource element blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource element blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
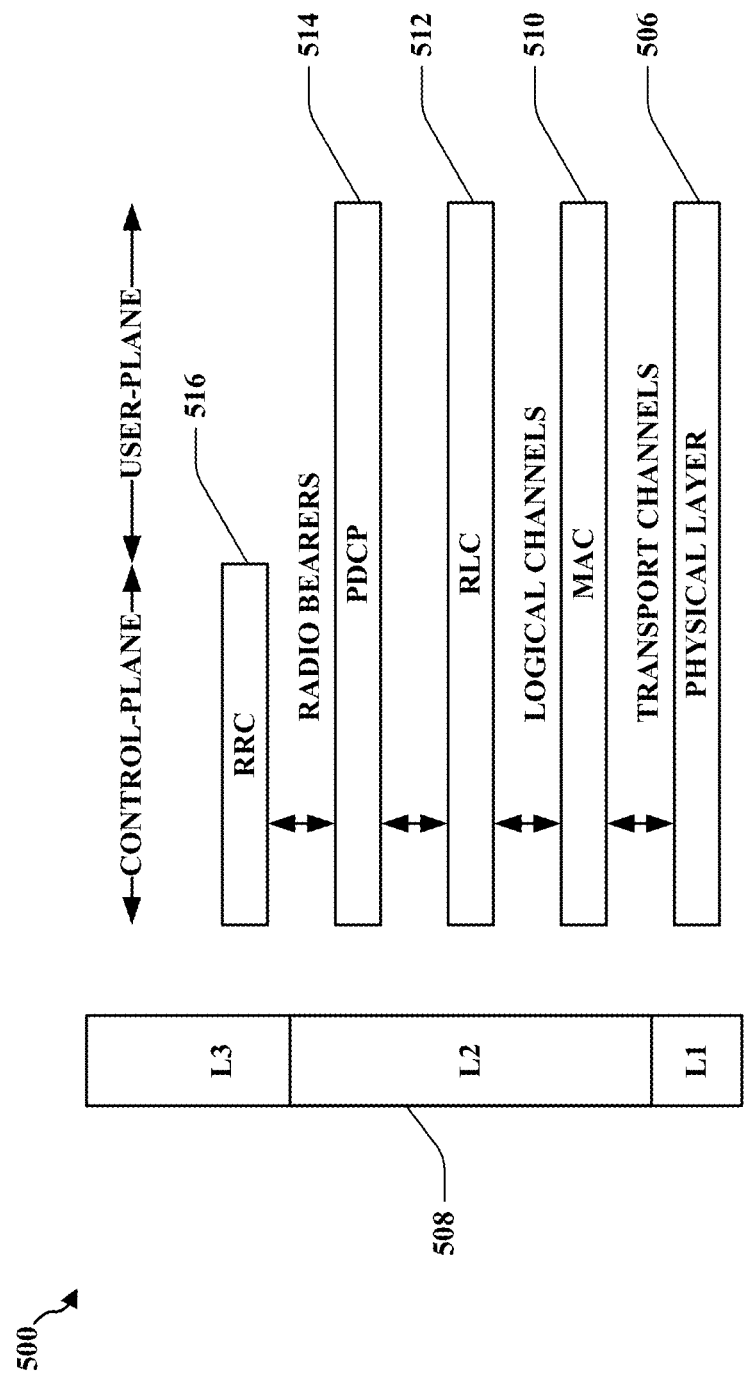
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource element blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
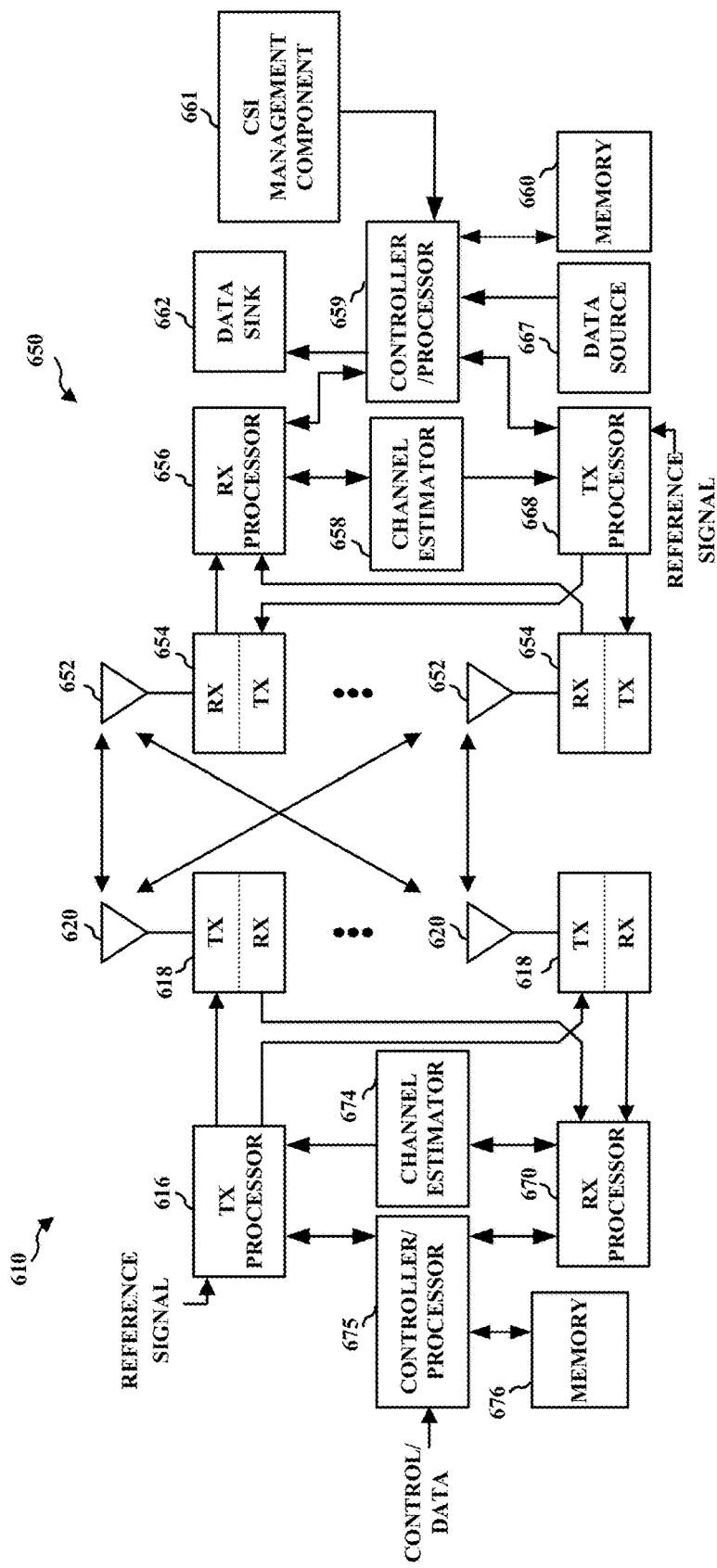
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal constitutes a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations. In addition, UE 650 may include a CSI management component 661 configured to generate and transmit CSI to a network entity (e.g., access points 105) according to legacy and/or ULL CSI reporting processes described in the present disclosure.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

Figure 7:
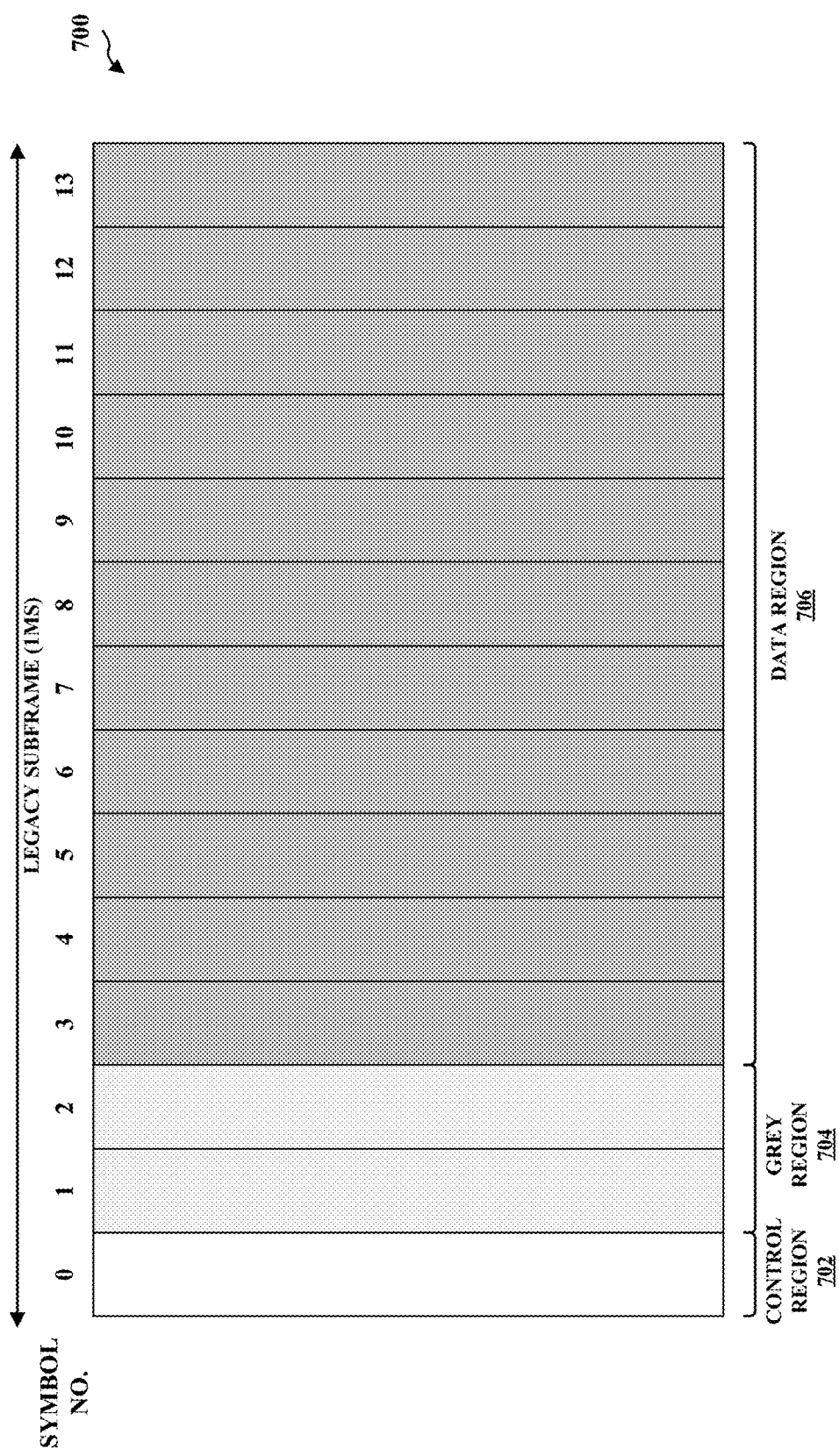
FIG. 7 is a diagram illustrating an example subframe and associated subframe regions according to the present disclosure.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. In addition, controller/processor may be in communication with a FIG. 7 is a diagram illustrating an example subframe 700, which may correspond to an LTE subframe, that is divided into a plurality of subframe regions, which may include a control region 702, a grey region 704, and a data region 706. In an aspect, subframe 700 may be divided in the time domain (horizontally) 14 symbols (symbols 0-13), and each subframe region may include one or more of these symbols. For instance, in a non-limiting example, control region 702 may include symbol 0, grey region 704 may include symbols 1 and 2, and data region 706 may include symbols 3-13. Other examples, however, may include scenarios in which the individual symbols are part of an alternative subframe region than illustrated in the example subframe 700 of FIG. 7. In an aspect, control region 702 includes one or more subframes during which information is transmitted via one or more control channels in a wireless communications system. In such an aspect, the transmissions may occur primarily or exclusively via the one or more control channels. Additionally, the data region 706 includes one or more subframes during which information may be transmitted via one or more data channels. In such an aspect, the transmissions may occur primarily or exclusively via the one or more data channels. Furthermore, grey region 704 includes one or more subframes during which information is transmitted on both control channels and data channels in the wireless communication system.

In an aspect of the present disclosure, a UE may be configured to generate and transmit CSI to a network entity, where the data used for the generation of the CSI is subframe-region-specific. For instance, in an aspect, a UE may detect a CSI reporting trigger that mandates CSI reporting according to channel conditions at during one or more symbols in a particular subframe region. Where one or more symbols for CSI generation are associated with control region 702, the UE may generate CSI based at least one common reference signal (CRS) received in the control region. Furthermore, where the CSI reporting trigger is associated with one or more symbols of grey region 704, the UE may identify one or more REs or REGs or REGs in the gray region for interference measurement and may measure interference associated with the REs or REGs to obtain an interference measurement. In an aspect, when the CSI is generated for one or more symbols of a grey region, it may be generated based on this interference measurement. Moreover, where the CSI reporting trigger is associated with one or more symbols of data region 706, the UE may perform an Interference Measurement Resource (IMR) measurement of an IMR and may generate the CSI based on the IMR measurement.

Figure 8:
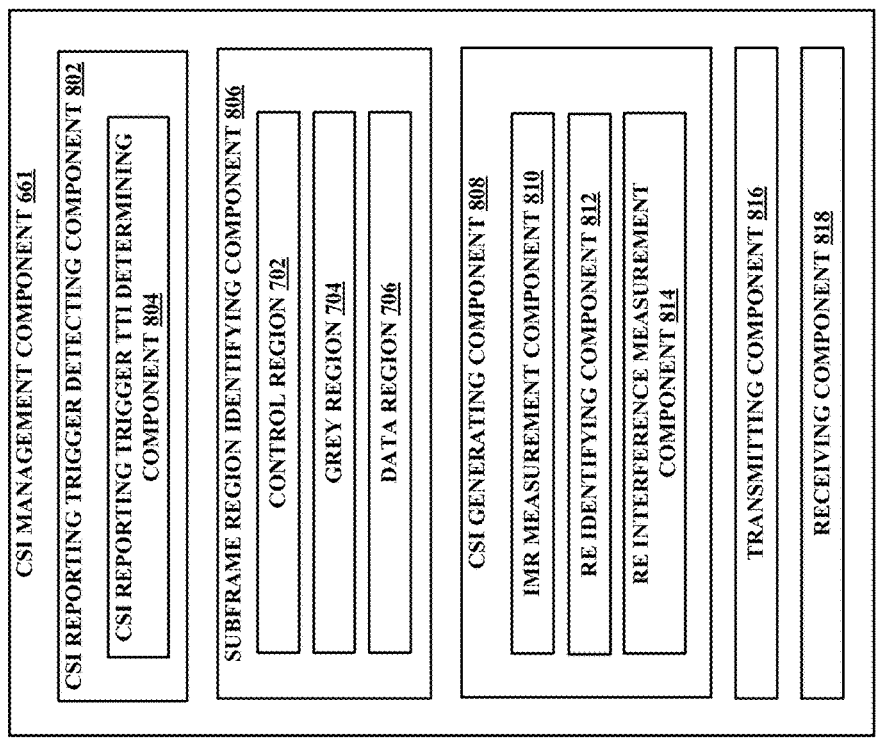
FIG. 8 is a diagram illustrating a CSI management component configured to implement aspects of the present disclosure.

FIG. 8 is a block diagram containing a plurality of sub-components of a CSI management component 661 (see FIG. 6), which may be implemented by a UE of the present disclosure for generating and transmitting CSI to one or more network entities. In an aspect, the CSI may include, but is not limited to, one or more of a rank indicator, a precoding type indicator (PTI), precoding matrix index (PMI), and/or a channel quality indicator (CQI).

In an aspect of the present disclosure, CSI management component 602 may include a CSI reporting trigger detecting component 802, which may be configured to detect a CSI reporting trigger that signals generation and transmission of CSI to a network entity. In an aspect, detecting the CSI reporting trigger may include receiving a message from a network entity that commands or requests a UE to report CSI to the network entity. Alternatively, the CSI reporting trigger may include a configuration for periodic CSI reporting or an indication received via a control channel for aperiodic CSI reporting. In addition, CSI reporting trigger detecting component 802 may include a CSI reporting trigger TTI determining component 804, which may be configured to determine a TTI associated with a channel or communication for which CSI is to be reported based on the trigger. For instance, CSI reporting trigger TTI determining component 804 may determine that CSI reporting is triggered for a communication utilizing legacy LTE communications having a TTI on the order of 1 ms, and may perform CSI generation and reporting processes associated with legacy LTE. In the alternative, the CSI reporting trigger TTI determining component 804 may determine that CSI reporting is triggered for a communication utilizing ULL communications having a TTI on the order of up to one symbol (e.g., one symbol, two symbols, a slot in the two slots, etc.) of the subframe. In such an example, the UE may determine that subframe-region-based CSI generation and reporting is to be utilized.

Furthermore, according to the present disclosure, legacy LTE systems and ULL systems can trigger CSI reporting, which may include aperiodic CSI reporting. In an aspect, a set of carriers, REGs, subbands, or the like for which CSI is generated and transmitted may differ, or the processes involved in the generation of the CSI may differ, based on whether the CSI reporting trigger was received for a legacy communication or ULL communication. For example, the CSI reporting process performed by the UE may have relaxed and/or simplified CSI reporting process requirements relative to those of a legacy communication. For instance, under the ULL CSI reporting scheme of the present disclosure, the process may have a limited number of CSI reporting ranks (e.g., may be limited to rank 1 reporting) for reporting CSI to the network. The limitation of CSI reporting ranks can be done explicitly or implicitly. A UE can be explicitly indicated or hardcoded to report a certain set of ranks for ULL (e.g., may be limited to rank 1). A UE can also receive a parameter from eNB (e.g., a codebook subset restriction parameter) and derives a limited set of ranks for CSI reporting. In another example, under the ULL CSI reporting scheme of the present disclosure, the process may have a limited set of PMIs for reporting CSI to the network. In a further example, under the ULL CSI reporting scheme of the present disclosure, the process may have a limited set of reporting modes or simplified reporting modes for reporting CSI to the network. Moreover, in yet another example, under the ULL CSI reporting scheme of the present disclosure, the process may have a differential CQI reporting (e.g., 1 bit to indicate improved or degraded CQI) or a relaxed performance requirement (e.g., a larger range of values for two adjacent CQI values) for reporting CSI to the network. As an example, instead of using a 4-bit CQI as in the legacy CSI reporting, a 3-bit CQI may be used for ULL. The CQI values corresponding to the 3-bit CQI can be a subset of the CQI values corresponding to the 4-bit CQI. With this, the accuracy of CQI reporting for ULL can be relaxed. In addition, the ULL process may have a limited number of subbands for which CSI is reported to the network relative to legacy processes. For instance, in an aspect of the present disclosure, ULL CSI may be reported to the network using a block of 25 radio RBs or RBGs, which may constitute a larger subband size than that of legacy CSI reporting processes.

In an additional aspect of the present disclosure, legacy and ULL CSI reporting triggers may overlap in time (e.g., symbol) and/or frequency (e.g., REG). In some examples, though separate legacy and ULL triggers may be detected, both triggers may indicate a same reference resource for channel measurement and/or interference measurement upon which the generated CSI may be based. Alternatively, the legacy and ULL triggers (e.g., reporting requests received from a network entity) may indicate separate interference measurement resources for CSI reporting. Furthermore, although legacy and ULL CSI triggers may indicate a same reference resource for channel and/or interference measurement, different processing may still be applied based on whether the trigger is associated with a legacy or ULL communication or system.

In an aspect, CSI management component 661 may further include a subframe region identifying component 806, which may be configured to identify, based on detection of the CSI reporting trigger for a ULL communication, a subframe region for which the CSI is to be generated. In an aspect, this subframe region may be a control region 702, a grey region 704, or a data region 706, which are described in detail in FIG. 7, above.

In addition, CSI management component 661 may include a CSI generating component 808, which may be configured to generate CSI for transmission to a network entity based on the subframe region identified by subframe region identifying component 806. In an aspect, where the determined subframe region is control region 702, CSI generating component may generate the CSI based on a common reference signal (CRS), which may be received by receiving component 818.

In an alternative example, where the subframe region identifying component 806 identifies the subframe region as the grey region 704, an RE identifying component 812 in the CSI generating component 808 may identify one or more REs or REGs in the symbols of the gray region that are to be utilized for CSI generation. For instance, once the one or more REs or REGs are identified by the RE identifying component 812, an RE interference measurement component 814 may measure interference associated with the one or more REs or REGs to obtain an interference measurement. Thereafter, the CSI generating component 808 may generate CSI based on the interference measurement of the one or more REs.

In a further example, where the subframe region identifying component 806 identifies the subframe region as the data region 706, the CSI generating component may utilize an Interference Measurement Resource (IMR) measurement component 810 to perform an IMR measurement (e.g., interference measurement) of an identified IMR. Thereafter, the CSI generating component 808 may generate the CSI based on the IMR measurement.

Furthermore, in an aspect, CSI generating component 808 may be configured to generate the CSI for a communication or system having a first TTI over a plurality of subbands (or resource elements), where the subband size for the CSI is larger than a subband size associated with CSI generation for a communication or system having a second TTI. For example, where a CSI generation process is associated with a ULL process or communication, the CSI generating component may be configured to generate CSI for a larger subband than that of a legacy LTE communication or CSI process. In an additional aspect, the CSI generation for the first TTI may be restricted compared with the CSI measurement for the second TTI. In an aspect, such a restriction may include a reduced set of ranks, a reduced set of precoding matrix indicators, a reduced set of CSI reporting types, a reduced performance requirement, or any combination thereof.

Furthermore, CSI generating component 808 may be configured to generate the CSI as a differential CSI relative to a previously reported CSI (of the same or a different TTI). For instance, the CSI generating component 808 may be configured to determine that a prior CSI transmitted to the network entity was based on a prior CSI reporting trigger associated with a second TTI (e.g., a legacy LTE 1 ms TTI CSI). In an aspect, were a current CSI is associated with a communication having a first TTI (e.g., a ULL one symbol TTI CSI process), CSI generating component 808 may be configured to generate a differential CSI relative to the prior CSI.

In an additional aspect, CSI management component 661 may include a transmitting component 816, which may be configured to transmit the generated CSI to one or more network entities. In an aspect, transmitting component 816 may include a transmitter, transceiver, related circuitry, and/or any other component configured to transmit wireless communication signals.

Figure 9:
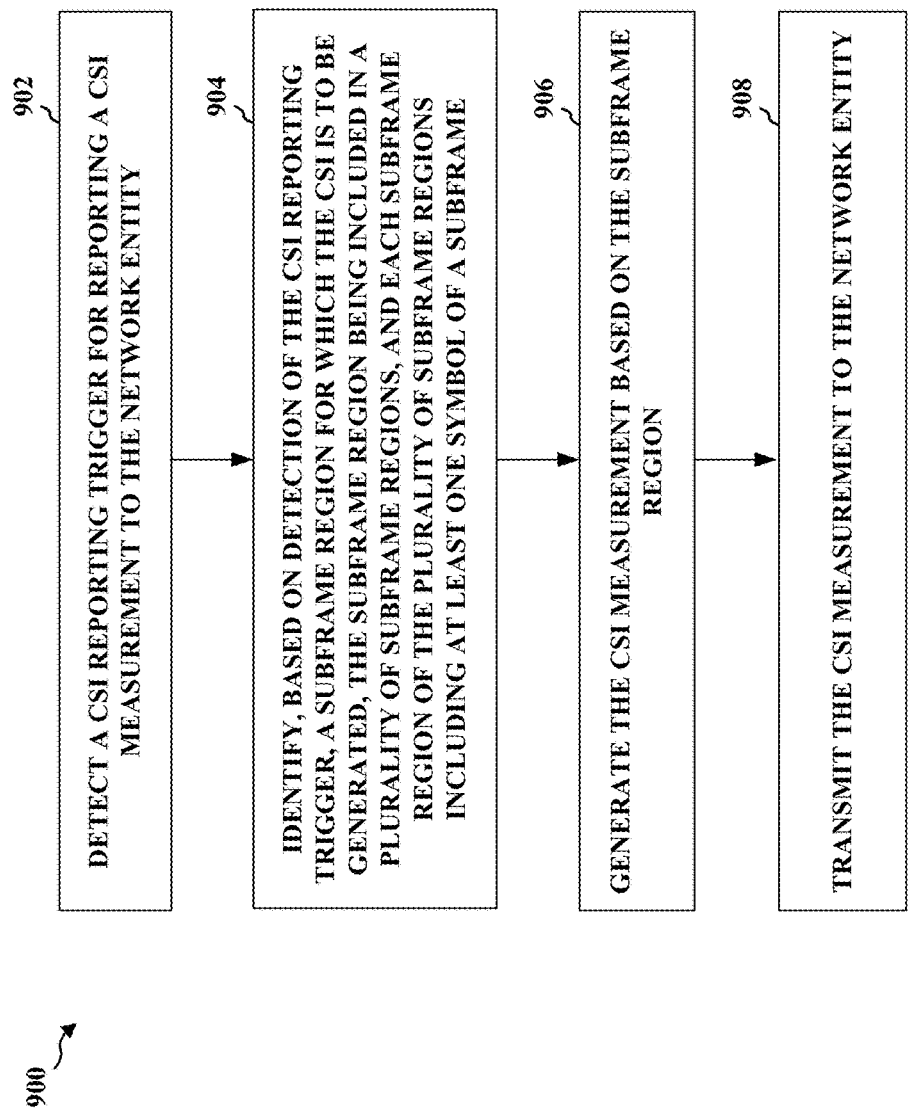
FIG. 9 is a flow chart of a method of wireless communication according to the present disclosure.

FIG. 9 illustrates an example method 900 of the present disclosure, which may be performed by a UE of the present disclosure or a component therein (e.g., CSI management component 661 of FIGS. 6 and 8). For example, in an aspect, at block 902, method 900 may include detecting a CSI reporting trigger for reporting CSI to the network entity. In an aspect, the CSI reporting trigger may be associated with a ULL CSI reporting process (e.g., having a first TTI) and/or a legacy LTE CSI reporting process (e.g., having a second TTI larger than that of the first TTI). In addition, in some examples, the CSI reporting trigger may be at least one of a configuration for periodic CSI report or an indication in a control channel for aperiodic CSI report. In addition, block 902 may be performed by CSI reporting trigger detecting component 802 of FIG. 8 or controller/processor 659 of FIG. 6.

Furthermore, method 900 may include, at block 904, identifying, based on detection of the CSI reporting trigger, a subframe region for which the CSI is to be generated. As described above, the subframe region may be one of a plurality of subframe regions, where each subframe region of the plurality of subframe regions includes at least one symbol of a subframe. In an aspect, these subframe regions may include a control region 702, grey region 704, and/or a data region 706 (see FIGS. 7 and 8). In an aspect, block 904 may be performed by subframe region identifying component 806 of FIG. 8 or controller/processor 659 of FIG. 6.

In an additional aspect, method 900 may include, at block 906, generating the CSI based on the subframe region identified in block 904. For instance, though not specifically shown in FIG. 9, block 906 may include generating the CSI based on the at least one CRS received in a control region. Alternatively, block 906 may include generating the CSI based on an IMR measurement (e.g., an interference measurement at an IMR) when the subframe region identified at block 904 is the data region. In an additional alternative aspect, block 906 may include generating the CSI based on an interference measurement of identified REGs in a grey region where the grey region 704 is identified as the subframe region at block 904. In an additional aspect, block 906 may include generating a differential CSI relative to a prior CSI. Block 906 may be performed by CSI generating component 808 of FIG. 8 or controller/processor 659 of FIG. 6.

Furthermore, method 900 may include, at block 908, transmitting the CSI to the network entity. In an aspect, block 908 may be performed, for example, by transmitting component 816 of FIG. 8 or one or more of TX processor 668, transmitters 654TX, or antennas 652 of FIG. 6.

In an aspect, for inter-cell interference coordination, instead of coordinating on a per subframe basis, interference coordination can also be performed based on a symbol-level. As an example, interference coordination can be done on a per symbol basis. In another example, interference coordination can be done on a per subframe region basis. Interference coordination can be in the form of information exchange in backhaul, over-the-air, or a combination thereof.

In an aspect, a limitation of a number of CSI processes that can be supported by a UE can be enforced. Management of a max number of CSI processes for ULL can be separately performed or jointly performed with management of a maximum number of CSI processes for legacy. In a non-limiting example, a UE can indicate a capability of handling at most 5 CSI processes for legacy communication, 5 CSI processes for ULL communication, and 5 CSI processes for a mixture of both. In any symbol, a UE can determine whether a number of CSI processes triggered for CSI reporting exceeds its indicated capability or not. If it is exceeded, a UE may report some CSI processes in a regular manner, while treating other CSI processes in a special manner. As an example, the UE may report for the other CSI processes an outdated report or an out-of-range (00R) value. The UE may also omit the corresponding CSI reports. The selection of the CSI processes for a special treatment can be based on a CSI process identifier, a cell index identifier, a subframe set identifier, a TTI length, or a combination thereof.

In an example, a UE may give a higher priority for CSI reporting for a communication with a shorter TTI length. In such a case, under a collision between reporting a CSI for ULL and reporting a CSI for legacy, reporting a CSI for legacy may be omitted or specially treated, while reporting a CSI for ULL can be processed with a regular manner.

Figure 10:
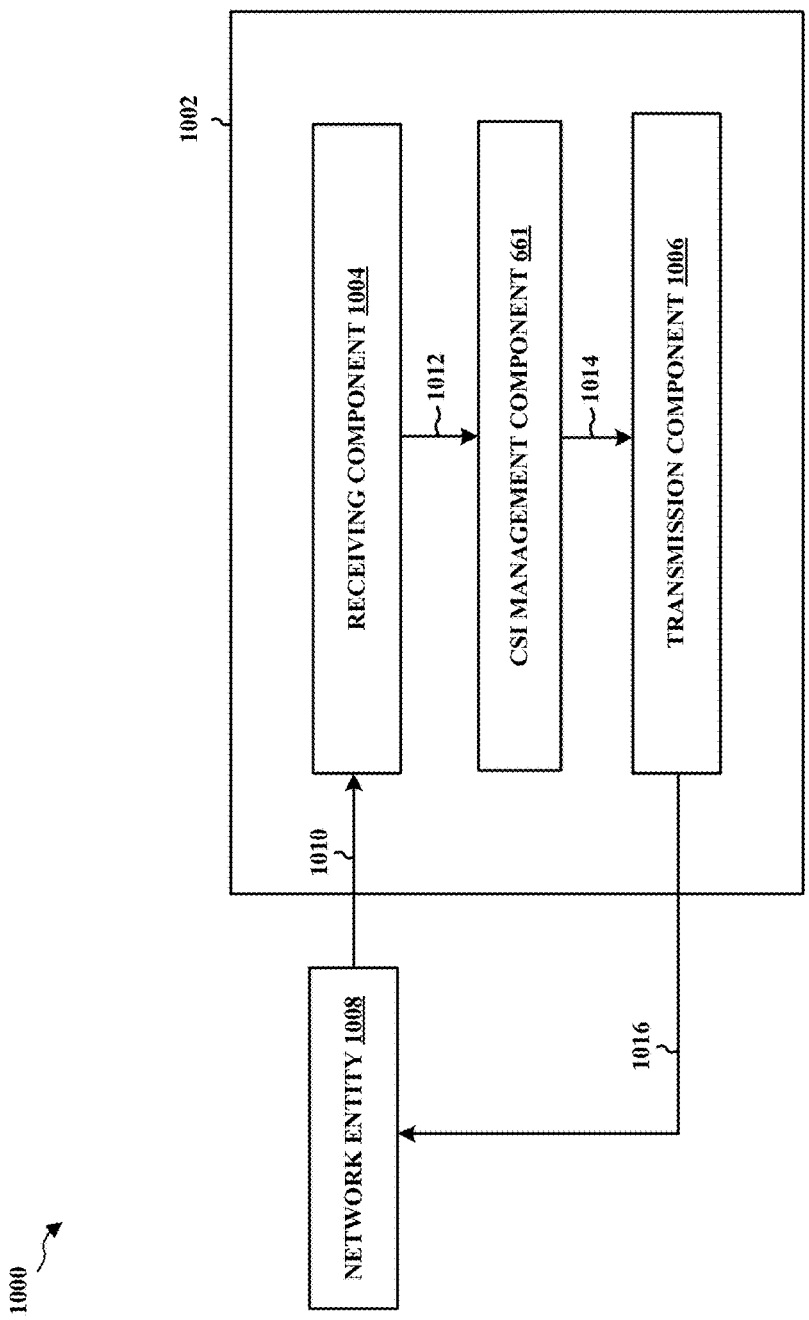
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus 1002 may be a UE, such as UE 115 of FIG. 1, UE 206 of FIG. 2, and/or UE 650 of FIG. 6. The apparatus 1002 includes a receiving module 1004 that is configured to receive downlink data/messages 1010, which may include one or more messages that include a CSI reporting trigger 1012 requesting or commanding the UE to report CSI to the network entity, such as, but not limited to, one or more indications received via a control channel for aperiodic CSI reporting. Such downlink data/messages 1010 may be transmitted to apparatus 1002, for example, by network entity 1008, which may include, but is not limited to, access point 105 of FIG. 1, macro eNB 204 or lower power class eNB 208 of FIG. 2, or eNB 610 of FIG. 6.

Once received, and in some examples, decoded or processed, the receiving module 1004 may send the received downlink data/messages 1010, including the CSI reporting trigger 1012 to a CSI management component 661 (see, e.g., FIG. 8). In an aspect, upon receiving the CSI reporting trigger 1012 that may be included in the downlink data/messages 1010, the CSI management component 661 may generate a CSI measurement based on a subframe region for which the CSI is to be generated. Furthermore, the CSI management component 661 may send the generated CSI measurement 1014 to transmission module 1006. In turn, the transmission module 1006 may be configured to transmit the uplink transmissions 1016 to network entity 1008.

The apparatus may include additional modules that perform each of the steps of the method 900 (or an associated algorithm) in the aforementioned flow chart of FIG. 9. As such, each step in the aforementioned flow chart of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
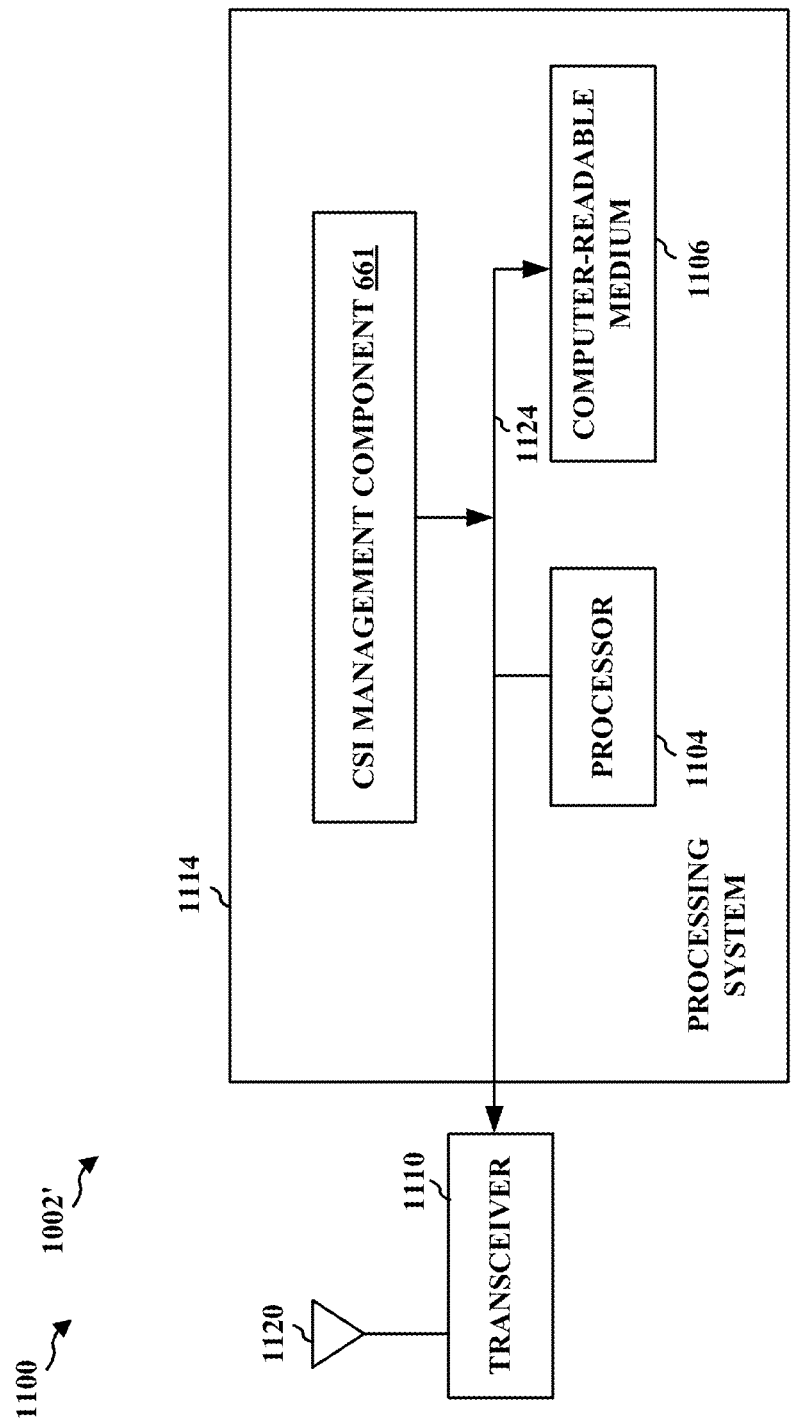
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. Like apparatus 1002, the apparatus 1002' may be a UE, such as UE 115 of FIG. 1, UE 206 of FIG. 2, and/or UE 650 of FIG. 6, and may be the same apparatus as apparatus 1002 of FIG. 10. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the CSI management component 661 and its related subcomponents (see, e.g., FIG. 8), and the computer-readable medium 1106. The bus 1124 may also link various other circuits such as timing sources, peripherals, voltage regulators, and power management circuits, which are well known in the art, and therefore, will not be described any further.

The processing system 1114 may be coupled to a transceiver 1110, which, in some examples, may include transmitting component 816 of FIG. 8, receiving component 818 of FIG. 8, receiving module 1004 of FIG. 10, and/or transmission module 1006 of FIG. 10. The transceiver 1110 is coupled to one or more antennas 1120. The transceiver 1110 provides a means for communicating with various other apparatus (which may include, but are not limited to, access point 105 of FIG. 1, macro eNB 204 or lower power class eNB 208 of FIG. 2, eNB 610 of FIG. 6, network entity 1008 of FIG. 10.) The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software. The processing system further includes CSI management component 661 and its related subcomponents (see, e.g., FIG. 8), which may be configured to perform one or more of the techniques for CSI reporting described in the present disclosure. The modules/components may be software modules running in the processor 1104, resident/stored in the computer-readable medium 1106, one or more hardware modules coupled to the processor 1104, or some combination thereof.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of reporting channel state information (CSI) to a network entity, comprising:
   detecting a CSI reporting trigger for reporting CSI to the network entity;
   identifying, based on detection of the CSI reporting trigger, whether a subframe region of a subframe, associated with one or more symbols for which the CSI is to be generated is a control region defined by at least a first symbol of the subframe during which transmissions occur via one or more control channels, a data region defined by at least a second symbol of the subframe during which transmissions occur exclusively via one or more data channels, or a grey region defined by at least a third symbol of the subframe, wherein each of the control region, the data region, and the grey region is included in the subframe;
where the subframe region is identified as the control region, generating the CSI based on a first measurement;
where the subframe region is identified as the data region, generating the CSI based on a second measurement;
where the subframe region is identified as the grey region, generating the CSI based on a third measurement; and
transmitting the CSI to the network entity,
wherein the control region, the data region, and the grey region are defined according to a first wireless communication technology that is based on a transmission time interval (TTI) having a duration of the subframe, and wherein transmitting the CSI comprises transmitting the CSI based on a second wireless communication technology and in a TTI having a duration less than the subframe.

2. The method of claim 1, wherein the subframe region is identified as the control region, the control region including at least one symbol during which information is transmitted via one or more control channels.

3. The method of claim 2, further comprising receiving at least one common reference signal (CRS) in the control region, and wherein generation of the CSI based on the first measurement includes generating the CSI based on the at least one CRS received in the control region.

4. The method of claim 1, wherein the subframe region is identified as the data region, the data region including at least one symbol during which information is transmitted via one or more data channels.

5. The method of claim 4, further comprising performing an Interference Measurement Resource (IMR) measurement of an IMR, and wherein generation of the CSI based on the second measurement includes generating the CSI based on the IMR measurement.

6. The method of claim 1, wherein the subframe region is identified as the grey region, the grey region including at least one symbol during which information is transmitted via one or both of one or more control channels or one or more data channels.

7. The method of claim 6, further comprising identifying one or more resource element groups (REGs) in the grey region for interference measurement; and
measuring interference associated with the one or more REGs to obtain an interference measurement,
wherein generation of the CSI based on the third measurement further includes generating the CSI based on the interference measurement.

8. The method of claim 1, further comprising determining whether the CSI reporting trigger is associated with a first transmit time interval (TTI), wherein the first TTI is less than a second TTI, and wherein legacy communications with the network entity use the second TTI.

9. The method of claim 8, wherein generation of the CSI is performed over a plurality of subbands, where a subband size for the CSI is larger than a subband size associated with generation of CSI for the second TTI.

10. The method of claim 8, wherein the CSI for the first TTI is restricted compared with the CSI for the second TTI, wherein the first TTI is restricted by implementing one or more of a reduced set of ranks, a reduced set of precoding matrix indicators, a reduced set of CSI reporting types, or a reduced performance requirement for the first TTI.

11. The method of claim 8, further comprising determining that a prior CSI transmitted to the network entity was based on a prior CSI reporting trigger associated with the second TTI, and wherein generation of the CSI comprises generating a differential CSI relative to the prior CSI.

12. The method of claim 1, wherein the CSI reporting trigger is at least one of a configuration for periodic CSI reporting or an indication in a control channel for aperiodic CSI reporting.

13. An apparatus for reporting channel state information (CSI) to a network entity, comprising:
means for detecting a CSI reporting trigger for reporting CSI to the network entity;
means for identifying, based on detection of the CSI reporting trigger, whether a subframe region of a subframe, associated with one or more symbols for which the CSI is to be generated is a control region defined by at least a first symbol of the subframe during which transmissions occur via one or more control channels, a data region defined by at least a second symbol of the subframe during which transmissions occur exclusively via one or more data channels, or a grey region defined by at least a third symbol of the subframe, wherein each of the control region, the data region, and the grey region is included in the subframe;
where the subframe region is identified as the control region, means for generating the CSI based on a first measurement;
where the subframe region is identified as the data region, means for generating the CSI based on a second measurement;
where the subframe region is identified as the grey region, means for generating the CSI based on a third measurement; and
means for transmitting the CSI to the network entity,
wherein the control region, the data region, and the grey region are defined according to a first wireless communication technology that is based on a transmission time interval (TTI) having a duration of the subframe, and wherein the means for transmitting the CSI transmits the CSI based on a second wireless communication technology and in a TTI having a duration less than the subframe.

14. The apparatus of claim 13, wherein the subframe region is identified as the grey region, the grey region including at least one symbol during which information is transmitted via one or more control channels, one or more data channels, or any combination thereof, and further comprising:
means for identifying one or more resource element groups (REGs) in the grey region for interference measurement; and
means for measuring interference associated with the one or more REGs to obtain an interference measurement,
wherein the means for generating the CSI based on the third measurement comprise means for generating the CSI based on the interference measurement.

15. A non-transitory computer-readable medium storing computer-executable code for reporting channel state information (CSI) to a network entity, the code comprising instructions executable to:
detect a CSI reporting trigger for reporting CSI to the network entity;
identify, based on detection of the CSI reporting trigger, whether a subframe region of a subframe, associated with one or more symbols for which the CSI is to be generated is a control region defined by at least a first symbol of the subframe during which transmissions occur via one or more control channels, a data region defined by at least a second symbol of the subframe during which transmissions occur exclusively via one or more data channels, or a grey region defined by at least a third symbol of the subframe, wherein each of the control region, the data region, and the grey region is included in the subframe;

where the subframe region is identified as the control region, generate the CSI based on a first measurement;

where the subframe region is identified as the data region, generate the CSI based on a second measurement;

where the subframe region is identified as the grey region, generate the CSI based on a third measurement; and transmit the CSI to the network entity, wherein the control region, the data region, and the grey region are defined according to a first wireless communication technology that is based on a transmission time interval (TTI) having a duration of the subframe, and wherein the code is executable to transmit the CSI based on a second wireless communication technology and in a TTI having a duration less than the subframe.

16. The computer-readable medium of claim 15, wherein the subframe region is identified as the grey region, the grey region including at least one symbol during which information is transmitted via one or more control channels, one or more data channels, or any combination thereof, and the code comprising instructions executable to:

identify one or more resource element groups (REGs) in the grey region for interference measurement; and measure interference associated with the one or more REGs to obtain an interference measurement, wherein the instructions executable to generate the CSI based on the third measurement comprise instructions executable to generate the CSI based on the interference measurement.

17. An apparatus for reporting channel state information (CSI) to a network entity, comprising:

a processor;

memory in electronic communication with the processor; and instructions stored in the memory, the instructions being executable by the processor to:

detect a CSI reporting trigger for reporting CSI to the network entity;

identify, based on detection of the CSI reporting trigger, whether a subframe region of a subframe, associated with one or more symbols for which the CSI is to be generated is a control region defined by at least a first symbol of the subframe during which transmissions occur via one or more control channels, a data region defined by at least a second symbol of the subframe during which transmissions occur exclusively via one or more data channels, or a grey region defined by at least a third symbol of the subframe, wherein each of the control region, the data region, and the grey region is included in the subframe;

where the subframe region is identified as the control region, generate the CSI based on a first measurement;

where the subframe region is identified as the data region, generate the CSI based on a second measurement;

where the subframe region is identified as the grey region, generate the CSI based on a third measurement; and transmit the CSI to the network entity, wherein the control region, the data region, and the grey region are defined according to a first wireless communication technology that is based on a transmission time interval (TTI) having a duration of the subframe, and wherein the instructions are executable to transmit the CSI based on a second wireless communication technology and in a TTI having a duration less than the subframe.

18. The apparatus of claim 17, wherein the subframe region is the control region including at least one symbol during which information is transmitted via one or more control channels.

19. The apparatus of claim 18, wherein the instructions further comprise instructions being executable by the processor to receive at least one common reference signal (CRS) in the control region, and wherein the instructions executable to generate the CSI based on the first measurement comprise instructions executable by the processor to generate the CSI based on the at least one CRS received in the control region.

20. The apparatus of claim 17, wherein the subframe region is identified as the data region, the data region including at least one symbol during which information is transmitted via one or more data channels.

21. The apparatus of claim 20, wherein the instructions further comprise instructions being executable by the processor to perform an Interference Measurement Resource (IMIR) measurement of an IMIR, and wherein the instructions executable to generate the CSI based on the second measurement comprise instructions executable by the processor to generate the CSI based on the IMIR measurement.

22. The apparatus of claim 17, wherein the subframe region is identified as the grey region, the grey region comprising at least one symbol during which information is transmitted via one or both of one or more control channels or one or more data channels.

23. The apparatus of claim 22, wherein the instructions further comprise instructions being executable by the processor to:

identify one or more resource element groups (REGs) in the grey region for interference measurement; and measure interference associated with the one or more REGs to obtain an interference measurement, wherein the instructions executable to generate the CSI based on the third measurement further comprise instructions being executable by the processor to generate the CSI based on the interference measurement.

24. The apparatus of claim 17, wherein the instructions further comprise instructions being executable by the processor to determine whether the CSI reporting trigger is associated with a first transmit time interval (TTI), wherein the first TTI is less than a second TTI, and wherein legacy communications with the network entity use the second TTI.

25. The apparatus of claim 24, wherein the instructions executable to generate the CSI comprise instructions executable by the processor to generate the CSI over a plurality of subbands, where a subband size for the CSI is larger than a subband size associated with generation of CSI for the second TTI.

26. The apparatus of claim 24, wherein the CSI for the first TTI is restricted compared with the CSI for the second TTI, wherein the first TTI is restricted by implementing one or more of a reduced set of ranks, a reduced set of precoding matrix indicators, a reduced set of CSI reporting types, or a reduced performance requirement for the first TTI.

27. The apparatus of claim 24, wherein the instructions further comprise instructions being executable by the processor to determine that a prior CSI transmitted to the network entity was based on a prior CSI reporting trigger associated with the second TTI, and wherein the instructions executable to generate the CSI comprise instructions executable by the processor to generate a differential CSI relative to the prior CSI.

28. The apparatus of claim 17, wherein the CSI reporting trigger is at least one of a configuration for periodic CSI reporting or an indication in a control channel for aperiodic CSI reporting.

* * * * *